Feb. 23, 1965  W. T. OHLHAUSEN  3,170,258
GATE WITH AUTOMATIC CLOSER
Filed May 11, 1962
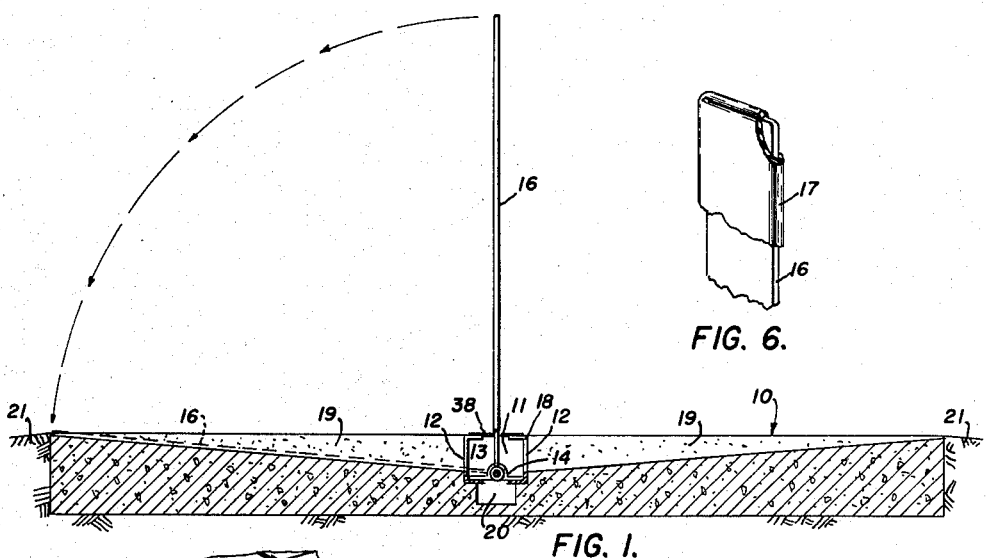
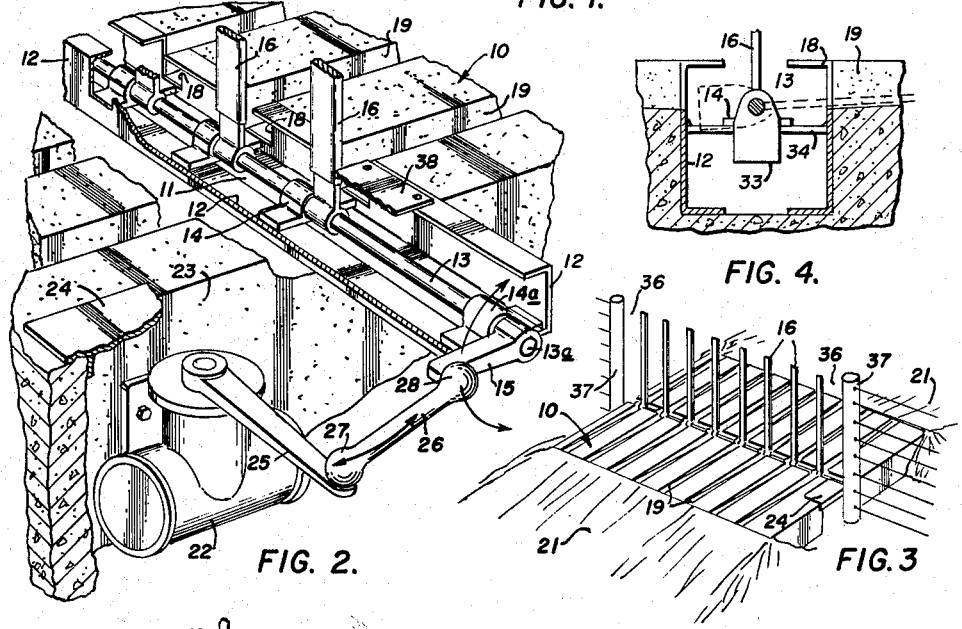
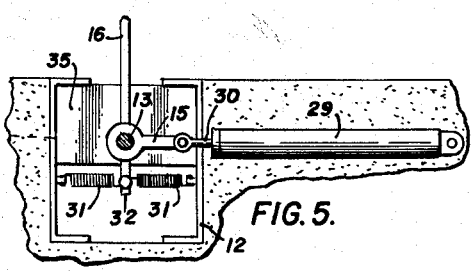
WILLIAM T. OHLHAUSEN
INVENTOR.
BY *Herbert J. Brown*
ATTORNEY United States Patent Office 3,170,258
Patented Feb. 23, 1965

3,170,258
GATE WITH AUTOMATIC CLOSER
William T. Ohlhausen, 8037 Down Drive,
Fort Worth, Tex.
Filed May 11, 1962, Ser. No. 194,053
5 Claims. (Cl. 39—5)

This invention relates to automatic gates and is directed specifically to improvements in the type of bump gate which stands upright on a hinge at ground level to be depressed, driven over by a motor vehicle and automatically regaining its upright position when the vehicle has passed.

An object of this invention is to provide a gate of the described type which operates easily with low inertia, reducing the danger of damage to the gate or the vehicle, which is delayed momentarily on its return to an upright position so that it does not drag on the underpinning of the vehicle, and which is cushioned by a protective covering.

It is a further object of the invention to provide a gate of this type which can be built entirely above ground without digging a pit so that surface water can be drained away from it.

Ground hinged gates in the past have generally been built into pits which accumulate dirt and trash as well as water and which have to be cleaned out periodically to prevent fouling of the operating elements of the gate. It is a purpose of the present invention to provide a gate which has all of its operating mechanism located just above the ground level, the supporting elements being built into a base resting on the roadway and approached with ramps so that drainage can be maintained away from the gate.

These and other objects of the invention will become apparent from the following description and the accompanying drawings, in which:

FIGURE 1 is a vertical section through the gate parallel to the roadway.

FIGURE 2 is a cutaway perspective detail of the operating mechanism.

FIGURE 3 is a general perspective view of the gate on a reduced scale.

FIGURE 4 is a cross section through a modified form of the gate hinge.

FIGURE 5 is an end view of a second modification of the operating mechanism.

FIGURE 6 is a cutaway perspective detail of one end of a gate picket.

As shown in FIGURES 1 to 3, the gate consists essentially of a concrete base 10 containing a transverse slot 11 lined with a pair of steel channels 12 which form a box like enclosure extending the full width of the base 10 and open at both ends.

A shaft 13 runs along the centerline of the slot 11 and is held in place by journals 14 spaced at suitable intervals and attached to the bottom flanges of the channels 12. The shaft 13 extends beyond the ends of the channels 12 at 13a and is supported by a journal 14a even with the ends of the channels. A bell crank 15 is rigidly attached to the extended portion 13a of the shaft 13 and normally lies in a horizontal position as shown in FIGURE 2. Vertical pickets 16 are spaced at intervals along the shaft 13 and are rigidly attached thereto. These pickets 16 are preferably made of thin flat spring steel stiff enough to stand upright when supported by the shaft 13 but resilient enough to give without breaking or taking a permanent bend under the impact of a vehicle. Each picket 16 is covered with rubber or plastic envelope 17 which acts as a shock absorber and protects both the vehicle and the gate from abrasion. The envelope 17 covers the ends of the pickets 16 as well as the face in the manner shown in FIGURE 6.

The steel channels 12 are notched in their upper edges to allow the pickets 16 to lie down. The notches 18 are exactly in line with the pickets and are only slightly wider. The concrete base 10 is provided with parallel grooves 19 spaced to match the pickets 16 and slope from the top of the base 10 at their outer ends downward toward the level of the shaft 13 so that when the pickets 16 are depressed to allow the passage of a vehicle they come to rest close to the bottoms of the grooves. The thickness of the base 10 is sufficient to allow for a drainage channel 20 centered under the shaft 13 and below the lower ends of the grooves 19 which will carry away rain water from the grooves 19 which, at the same time, will help flush accumulated dirt. Earthen ramps 21 are provided at each end of the base 10 to bring the vehicle up to the level of the base from the roadway.

A standard pneumatically damped door closer 22 is mounted on the wall of a recess 23 in the base 10 and protected by a removable cover plate 24. The actuating arm 25 of the door closer 22 is connected to the bell crank 15 by means of a link 26 and ball and socket joints 27 and 28. The spring pressure of the door closer 22 normally holds the gate pickets 16 upright in the position shown in FIGURE 2 but allows the bell crank 15 to rotate nearly 90° in either direction, as indicated by the arrows, when the pickets 16 are pressed down by the passage of a vehicle. The pneumatic damping of the door closer 22 keeps the pickets 16 from returning immediately to an upright position, delaying their return long enough to prevent their bumping and scraping the underside of the vehicle. The longitudinal grooves 19 in the top of the base 10 discourage stock from coming up to the base and thereby make the gate doubly effective.

A lighter type of door closer 29 shown in FIGURE 5 may be used on smaller gates in which case the shaft 30 of the closer 29 is pivotally attached directly to the crank 15. If a light weight closer of this type is used it may be necessary to supply the gate with balancing springs 31 attached to a depending extension 32 of one or more of the pickets 16, or to supply the pickets with counterweights 33 as illustrated in FIGURE 4. In the two embodiments shown in FIGURES 4 and 5 the steel channels 12 are wider and fill the depth of the drainage channel 20 in the base, and in FIGURE 4 the journals 14 are supported on bars 34 welded between the channels 12 while in FIGURE 5 the journals 14 have been replaced by holes drilled in line in a series of plates 35 welded between the channels 12.

One additional advantage is that the entire gate installation can be made portable by constructing the base 10 out of wood, steel or concrete, and setting it up in any opening, 36, between fence posts, 37, and then building up the earthen ramps 21. An added refinement is provided by removable plates 38 covering the gap between the channels 12 in the spaces between the pickets 16. These plates will strengthen the structure of the gate hinge as shown n FIGURES 1 and 2 and will cut down considerably on the shock of the vehicle wheels crossing the gate.

The invention is not limited to the construction herein shown and described, but may be made in various ways within the scope of the appended claims.

What is claimed is:
1. A ground hinged bump gate comprising:
   a rectangular flat base of substantial thickness resting on a roadway,
   a transverse channel midway in said base and nearly as deep as the thickness of said base, a shaft suspended on bearings along the center of said channel below the surface of said base and above the bottom of said channel, pickets of flat spring material attached to and spaced along said shaft and normally extending upright from same in the same plane, parallel grooves in the upper surface of said base sloping from the ends of said base down toward the level of said shaft in the transverse channel, spaced even with said pickets and large enough to receive the same in a prone position, a crank on one end of said shaft, a pneumatically damped door closer attached to the side of said base and linked to said crank.

2. A ground hinged gate as defined in claim 1, and including:

spring means augmenting the maintenance of said pickets in an upright postion.

3. A ground hinged gate as defined in claim 1, and including:

weight means augmenting the maintenance of said pickets in an upright position.

4. A ground hinged bump gate comprising:

a rectangular flat base of substantial thickness resting on a roadway, a transverse channel midway in said base and nearly as deep as the thickness of said base, a shaft suspended on bearings along the center of said channel below the surface of said base and above the bottom of said channel, pickets attached to and spaced along said shaft and normally extending upright from same in the same plane, parallel grooves in the upper surface of said base sloping from the ends of said base down toward the level of said shaft in the transverse channel, spaced even with said pickets and large enough to receive the same in a prone position, a crank on one end of said shaft, a pneumatically damped door closer attached to the side of said base and linked to said crank.

5. A ground hinged bump gate comprising:

a rectangular flat base of substantial thickness resting on a roadway, a transverse channel midway in said base and nearly as deep as the thickness of said base, said channel being open at its ends, a shaft suspended on bearings along the center of said channel below the surface of said base and above the bottom of said channel, pickets attached to and spaced along said shaft and normally extending upright from same in the same plane, parallel grooves in the upper surface of said base sloping from the ends of said base down toward the level of said shaft in the transverse channel, spaced even with said pickets and large enough to receive the same in a prone position, a crank on one end of said shaft, a pneumatically damped door closer attached to the side of said base and linked to said crank.

References Cited by the Examiner
UNITED STATES PATENTS

| | | | |
|---|---|---|---|
| 2,024,063 | 12/35 | Roper | 39—5 |
| 2,538,470 | 1/51 | Peeples | 39—28 |
| 2,543,893 | 3/51 | Chandler | 39—24 |
| 2,758,399 | 8/56 | Youle et al. | 39—5 |
| 2,918,740 | 12/59 | Smith | 39—5 |
| 3,000,596 | 9/61 | Puffe | 39—5 |
| 3,022,590 | 2/62 | Ohlhausen | 39—24 |
| 3,089,267 | 5/63 | Wooden | 39—5 |

HARRISON R. MOSELEY, *Primary Examiner.*

ALDRICH F. MEDBERY, *Examiner.*